(12) United States Patent
Moussalli et al.

(10) Patent No.: US 9,720,092 B2
(45) Date of Patent: Aug. 1, 2017

(54) ENHANCED CONVERSION BETWEEN GEOHASH CODES AND CORRESPONDING LONGITUDE/LATITUDE COORDINATES

(71) Applicant: International Business Machines Corporation, Armonk, NY (US)

(72) Inventors: Roger Moussalli, Peekskill, NY (US); Sameh W. Asaad, Briarcliff Manor, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 14/669,715

(22) Filed: Mar. 26, 2015

(65) Prior Publication Data

US 2016/0283515 A1    Sep. 29, 2016

(51) Int. Cl.
*G06F 5/00* (2006.01)
*G01S 19/13* (2010.01)
*G01S 19/42* (2010.01)

(52) U.S. Cl.
CPC .............. *G01S 19/13* (2013.01); *G01S 19/42* (2013.01)

(58) Field of Classification Search
None
See application file for complete search history.

(56) References Cited

U.S. PATENT DOCUMENTS

| | | |
|---|---|---|
| 2013/0054647 A1 | 2/2013 | Terauchi |
| 2013/0339411 A1 | 12/2013 | Bogosian |
| 2014/0280318 A1 | 9/2014 | Simms et al. |
| 2015/0058390 A1* | 2/2015 | Bogosian .............. G01C 21/34 708/442 |
| 2015/0095333 A1* | 4/2015 | Porpora ............ G06F 17/30699 707/737 |
| 2016/0283515 A1* | 9/2016 | Moussalli ......... G06F 17/30241 |

OTHER PUBLICATIONS

Vikram Singla, "Finding Nearest Location with Open Box Query using Geohashing and MapReduce," Computer Science and Engineering Department, Thapar University, Patiala, Thesis for Master of Engineering in Computer Science and Engineering, Jul. 2013.

* cited by examiner

*Primary Examiner* — David H Malzahn
(74) *Attorney, Agent, or Firm* — Vazken Alexanian; Otterstedt, Ellenbogen & Kammer, LLP

(57) ABSTRACT

An apparatus for converting between a geohash code and latitude/longitude coordinates includes a conversion module operative in one of at least first and second modes. In the first mode, the conversion module receives a geohash code, a number of geohash code bits remaining to be processed and an initial input interval, and generates first and second output intervals that are updated after each geohash code bit processed. The latitude and longitude coordinates are generated based on the first and second output intervals, respectively. In the second mode, the conversion module receives a latitude or longitude value, the number of geohash code bits remaining to be processed and the initial input interval, and generates a given one of the first and second output intervals. The conversion module is configured to process data at a rate of one geohash code bit per hardware cycle.

20 Claims, 6 Drawing Sheets

ENHANCED CONVERSION BETWEEN GEOHASH CODES AND CORRESPONDING LONGITUDE/LATITUDE COORDINATES

BACKGROUND OF THE INVENTION

The present invention relates generally to the electrical, electronic and computer arts, and, more particularly, to geographical information management.

The ubiquitous availability of location sensing devices embedded in smartphones, vehicles, and other devices, combined with the ability to collect data at scale, enables fine-grained monitoring and modeling of human movement, both at an individual level and at a group level. Using trajectory data harvested by global positioning systems (GPS), radio frequency identification (RFID) and mobile devices, complex pattern queries can be posed against objects moving in both time and space. Answering these queries introduces opportunities for business intelligence, where prediction regarding future patterns can be used to solve challenging problems such as, but not limited to, traffic congestion prediction, crime pattern analysis and prediction, epidemic spread characterization and alerting, insurance pricing, and targeted advertising.

One significant challenge posed by processing spatial queries is the sheer amount of available spatial data; the volume of such data is increasing at an unprecedented rate, primarily attributable to the widespread use of GPS-enabled smart-phones and the like. In this context, high performance techniques are needed to process spatial queries in a reasonable amount of time.

Geohash is a hierarchical geocoding system that is often used for spatial indexing. Geohash presents several advantages over a traditional latitude/longitude geographic coordinate system, such as, for example, efficient indexing, support for hierarchical regions, arbitrary precision, and simple proximity estimation. However, geohashes do not replace latitude/longitude coordinates, primarily due to the format of disseminated data, as well as the dependency of several spatial algorithms on latitude/longitude coordinates. Accordingly, geohash codes often require conversion to and from other geographical data formats.

BRIEF SUMMARY

Principles of the invention, in accordance with one or more embodiments thereof, provide techniques for high-speed and flexible conversion between geohash codes and corresponding latitude/longitude coordinates. In one aspect, an exemplary apparatus for converting between a geohash code and latitude/longitude coordinates includes a conversion module operative in one of at least first and second modes. In the first mode, the conversion module is adapted to receive a geohash code, a number of geohash code bits remaining to be processed and an initial input interval, and being configured to generate first and second output intervals that are updated after each geohash code bit processed. The latitude and longitude coordinates are generated based on the first and second output intervals, respectively. In the second mode of operation, the first conversion module is adapted to receive a latitude or longitude value, the number of geohash code bits remaining to be processed and initial first and second input intervals, and is configured to generate a given one of the first and second output intervals. The first or second output interval is set as the first or second input interval, respectively, of a next subsequent hardware cycle. The conversion module is configured to process data at a rate of one geohash code bit per hardware cycle.

In another aspect, a conversion engine is provided for converting between a geohash code and latitude and longitude coordinates. The conversion engine includes a first register for holding an input data stream which comprises an input geohash code or input latitude and longitude values, depending on the conversion mode in which the conversion engine is operating. A first interface controller is coupled with the first register, the first interface controller being configured, in a first conversion mode, to de-interleave the input data stream. The conversion engine further includes first and second conversion pipelines coupled with the first interface controller. The first conversion pipeline is configured to convert between a geohash code and latitude coordinates, and the second conversion pipeline is configured to convert between the geohash code and longitude coordinates. A second interface controller is coupled with the first and second conversion pipelines, the second interface controller being configured, in a second conversion mode, to interleave respective outputs of the first and second conversion pipelines before being pushed to an output data stream. The conversion engine includes a second register coupled with the second interface controller and configured for holding the output data stream which comprises output latitude and longitude values or an output geohash code, depending on the conversion mode in which the conversion engine is operating. The conversion engine is configured to process data at a rate of one geohash code bit per hardware cycle.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. By way of example only and without limitation, one or more embodiments may provide one or more of the following advantages:

a geohash conversion engine capable of operating at wire speed;

providing runtime flexibility with respect to characteristics of the data it can process;

the conversion architecture allows a user to compromise on performance when limited by hardware resources (i.e., design time flexibility);

support for variable geohash code length;

Bi-modal conversion (i.e., geohash codes to and from latitude/longitude pairs).

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of an illustrative bidirectional geohash conversion engine for performing fast and flexible conversion of geohash codes to and from latitude/longitude coordinates. It is to be appreciated, however, that the invention is not limited to the specific apparatus and/or methods illustratively shown and described herein. Rather, aspects of the present disclosure relate more broadly to methods and apparatus for performing enhanced conversion between geohash codes and corresponding latitude/longitude coordinates. Moreover, it will become apparent to those skilled in the art given the teachings herein that numerous modifications can be made to the embodiments shown that are within the scope of the claimed invention. That is, no limitations with respect to the embodiments shown and described herein are intended or should be inferred.

As previously stated, with the growing use of embedded location-sensing devices, including, for example, GPS-enabled mobile devices, vehicles, and the like, combined with the ability to collect data at scale, one significant problem that has emerged is that geodatabases are unable to keep up with the required performance due primarily to the massive (and ever-increasing) amounts of data generated from embedded location-enabled devices. To exacerbate the problem, handling geohash codes is computationally demanding and entails bit-granular operations.

One or more embodiments of the invention focus on geographic information systems that make use of geohash; specifically, one or more embodiments tackle the kernel of converting between geohash codes and latitude/longitude coordinates by providing a geohash conversion engine configured to operate at wire speed (i.e., no stalls), at a constant throughput rate of one geohash code per hardware cycle. Furthermore, one or more embodiments provide a geohash conversion engine that is enhanced through the incorporation of runtime flexibility, where a length of the geohash codes can vary, while reducing misspent input/output bandwidth. For applications in which lower performance can be tolerated, embodiments of the invention provide a geohash conversion engine that can be configured to consume fewer hardware resources.

Figure 1A:
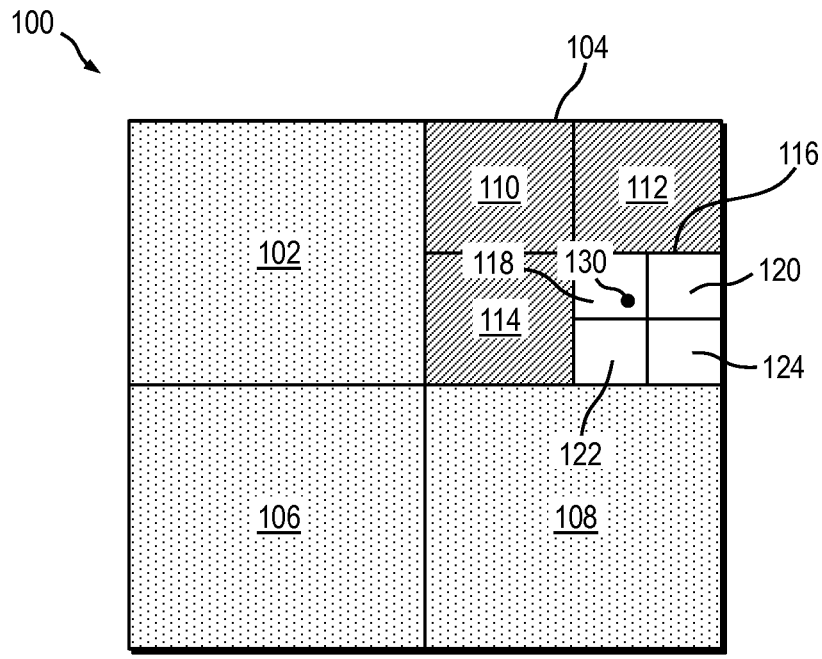
FIG. 1A conceptually depicts an illustrative division of a space into a plurality of buckets.

Geohash is a geographic coordinate system that hierarchically divides space into grid-shaped buckets. FIG. 1A conceptually depicts an illustrative division of a space 100 into a plurality of buckets, 102, 104, 106 and 108. Each bucket may be further subdivided into multiple grid-shaped buckets, and so on, creating a hierarchy of buckets as shown. For example, bucket 104 is divided into buckets 110, 112, 114 and 116, and bucket 116 is further divided into buckets 118, 120, 122 and 124.

Figure 1B:
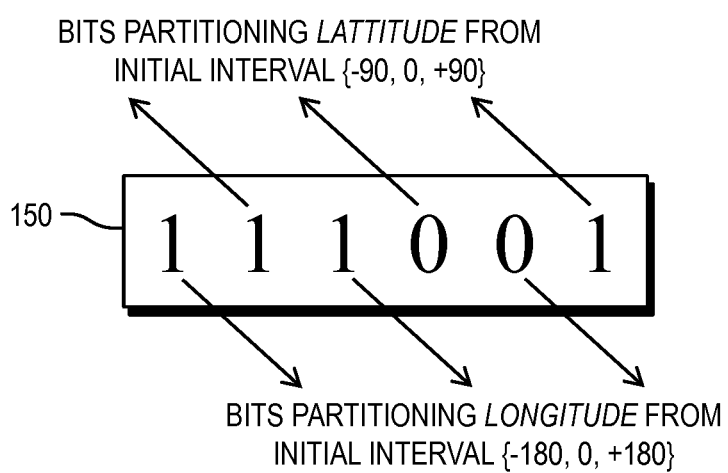
FIG. 1B conceptually depicts an exemplary geohash code represented as a string of bits.

FIG. 1B depicts an exemplary geohash code 150. The geohash code 150, represented in FIG. 1B as a string of bits, denotes a rectangle (bounding box) located on the earth. It provides a spatial hierarchy with arbitrary precision: the precision can be reduced (i.e., representing a larger area) by removing characters from the end of the string; that is, the longer the geohash code, the smaller the bounding box represented by the code. For example, a point of interest in FIG. 1A, point 130, can be represented by either of buckets 104, 116 or 118, depending on the required level of precision (i.e., tolerated error), with bucket 118 providing the highest level of precision and bucket 104 providing the lowest level of precision of the available buckets.

A geohash code can be represented as a binary string, where the bits respective to the longitude and latitude space divisions are interleaved. For example, the geohash code 150 includes a bit sequence, with a first set of interleaved bits (e.g., read from left to right, the first, third and fifth bits) representing bits partitioning longitude from an initial interval $\{-180, 0, +180\}$, and a second set of interleaved bits (e.g., read from left to right, the second, fourth and sixth bits) representing bits partitioning latitude from an initial interval $\{-90, 0, +90\}$.

Another property of geohash is that two locations with a long common geohash prefix are close to each other. Similarly, nearby locations usually share a similar prefix. However, it is not always guaranteed that two close locations share a long common prefix (when they are located near the border of two bounding boxes).

With reference to FIGS. 1A and 1B, a methodology for converting from latitude/longitude coordinates to geohash code will now be described. The longitude space is bounded by the initial interval {−180, 0, +180} representing the minimum (min), middle (mid), and maximum (max), respectively, of the interval. If the longitude of the point of interest (e.g., point 130) is greater than the mid of the interval (i.e., if the point 130 resides in the upper subinterval), then a geohash bit of "1" is produced, and the new interval becomes $$\left\{mid, \frac{mid + \max}{2}, \max\right\}.$$

Alternatively, if the longitude of the point of interest 130 is smaller or equal to the mid of the interval, then a geohash bit of "0" is produced, and the new interval becomes $$\left\{\min, \frac{\min + mid}{2}, mid\right\}.$$

This process is repeated up to the desired precision (number of geohash bits) in a bit-serial fashion. The same method is applied to the latitude, where the initial interval is {−90, 0, +90}. Finally, the longitude and latitude bits are interleaved in the resulting geohash code 150. FIG. 1B lists the binary geohash code for the illustrative point of interest 130 depicted in FIG. 1A.

With continued reference to FIGS. 1A and 1B, a methodology for converting from geohash code to latitude/longitude coordinates will now be described. Given a set of latitude/longitude bits in the geohash code, the respective intervals are updated in a manner consistent with the serial process described above, with no geohash bits generated at each step; instead, one geohash bit is consumed at each step. Each input geohash bit is examined to update the interval at hand, starting from the initial intervals {−90, 0, +90} and {−180, 0, +180} for latitude and longitude, respectively. The resulting latitude/longitude values are the respective mid values of the final latitude/longitude intervals.

As the term is used herein, a "single step" in the conversion process is defined as either one of: (i) the act of producing one geohash bit, when converting from latitude (or longitude) to geohash code; or (ii) the act of updating the latitude (or longitude) value (i.e., interval mid value), when converting from geohash code to latitude (or longitude). As described above, conversion comprises iterating over the single step as many times as dictated by the prescribed level of precision (number of input/output geohash code bits).

Figure 2:
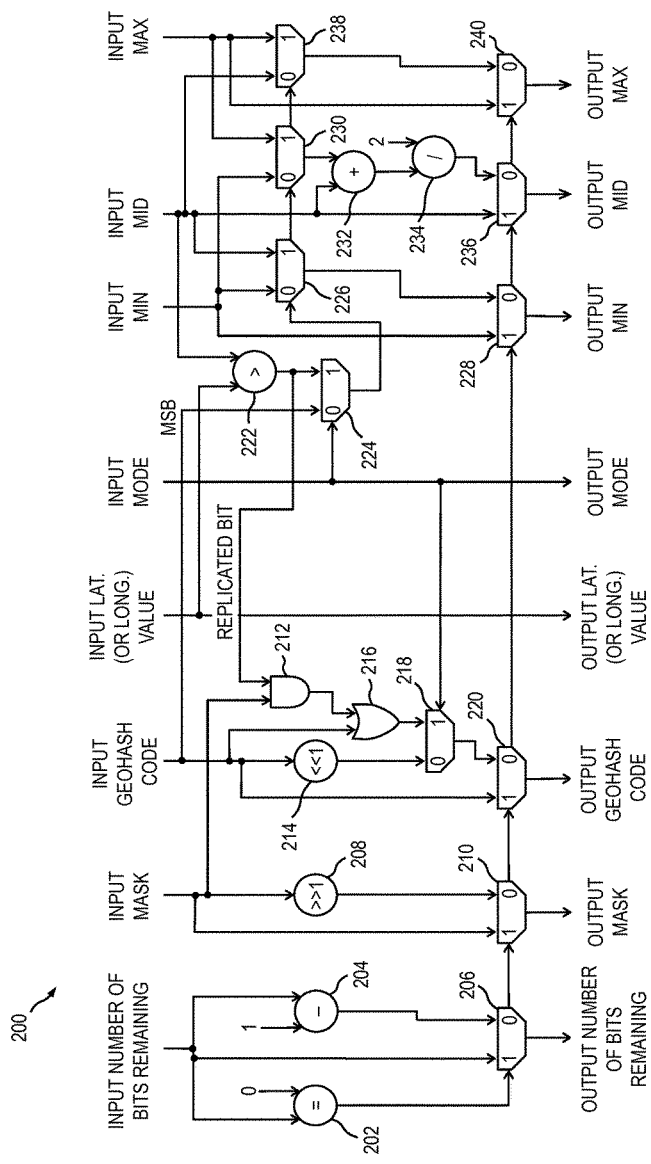
FIG. 2 is a block diagram depicting at least a portion of an exemplary basic conversion block implementing a single step in a process for converting between geohash code and latitude/longitude coordinates, according to an embodiment of the invention.

FIG. 2 is a block diagram depicting at least a portion of an exemplary basic conversion block 200 implementing a single step in a process for converting between geohash code and latitude/longitude coordinates, according to an embodiment of the invention. The conversion block 200 is configured to generate one geohash bit from a latitude (or longitude) coordinate, when converting from latitude/longitude coordinates to geohash code, or to update the latitude (or longitude) value (i.e., interval mid value) by processing one geohash bit, when converting from geohash code to latitude/longitude coordinates.

The conversion block 200 in this embodiment is designed with simplicity in mind, where an input interface matches an output interface of the block. Data flows from top to bottom, as the input values are (potentially) updated and passed to the output. The conversion block 200 is also flexible, as it provides conversion in either direction, using a mode bit for setting the conversion direction: mode 0 enables conversion from a geohash code bit to a latitude (or longitude) value, whereas mode 1 enables conversion from a latitude (or longitude) value to a geohash code bit. As used herein, the term "geo-to-ll" refers broadly to the conversion from a geohash code bit to a latitude (or longitude) value, and the term "ll-to-geo" refers broadly to the conversion from a latitude (or longitude) value to a geohash code bit.

By way of illustration only and without limitation, the conversion block 200 is configured to receive a plurality of input signals supplied to the conversion block, including number of bits remaining, mask, geohash code, latitude (or longitude) value, mode, min, mid and max input signals, and to generate a plurality of corresponding output signals, including number of bits remaining, mask, geohash code, latitude (or longitude) value, mode, min, mid and max output signals, respectively. The number of bits remaining input signal represents the number of bits remaining to be processed (i.e., produced or consumed, depending on the direction/mode in which the conversion block 200 is operating). The use of this field will be made clearer when implementing the conversion block 200 in a broader context, as will be described in further detail below. When a value of "0" is specified at the number of bits remaining input, then no change is applied to any of the input signals (see dashed lines in FIG. 2).

The mode signal sets the direction (i.e., mode) of the conversion block 200, where "0" indicates conversion from a geohash code bit to a latitude (or longitude) value, and "1" indicates conversion from a latitude (or longitude) value to a geohash code bit. When converting from latitude/longitude coordinates to geohash code (i.e., mode=1), the mask signal is used to update the appropriate geohash code bit (the latter being a multibit signal). As geohash codes are read from left to right (FIG. 1A), the mask signal is shifted right by one bit when a conversion step takes place. The initial value of the mask signal is "1000 . . . 0."

When operating in mode 0 (i.e., geo-to-ll), only the most significant bit (MSB) of the geohash code is used to update the input interval. The geohash code is also shifted left by one bit to omit the processed bit. When operating in mode 1 (i.e., ll-to-geo), only the one bit of the geohash code indicated by the input mask is updated. The value of the updated bit is "1" when the latitude (or longitude) value falls in the upper subinterval, and has a value of "0" otherwise.

The latitude or longitude value represents the value that is being converted to the respective latitude or longitude portion of a geohash code. This signal is only used in mode 1 when locating the value within the two portions of the input interval; the value of the signal is unchanged at the output of the conversion block 200.

The interval signals (min, mid and max) are updated as a function of the geohash code. Specifically, when operating in mode 0, the interval is updated based on the most significant geohash bit, whereas in mode 1, the interval is updated based on a comparison between the latitude (or longitude) value and the mid signal of the input interval.

With continued reference to FIG. 2, the conversion block 200 includes a first relational operator, which in this embodiment is an equal operator 202 (or comparator), configured to test the relation between the two input quantities—in this embodiment, number of bits remaining signal and the value "0"—and to return a prescribed logical output level (e.g., logic "1") when the two input quantities are equal. The conversion block 200 includes a second relational operator, which in this embodiment is a subtraction operator 204, configured to generate an output which represents a subtraction of one input from the other input; in this embodiment, the value one is subtracted from the number of bits remaining. Thus, the subtraction operator 204 functions essentially as a counter which is decremented by one (or another prescribed value) each processing (i.e., hardware) cycle.

Outputs from the equal operator 202 and subtraction operator 204 are supplied to a first two-input multiplexer 206. More particularly, the multiplexer 206 is adapted to receive, at a first input, the number of bits remaining input signal, to receive, at a second input, the output of the subtraction operator 204, and to receive, at a control input, the output of the equal operator 202. The multiplexer 206 is configured to generate the number of bits remaining output signal indicative of the first input or second input as a function of the control input. In one or more embodiments, the number of bits remaining output signal will be equal to the number of bits remaining input signal when the number of bits remaining to be processed by the conversion block 200 is zero (i.e., the output of the equal operator 202 is true or "1"). Alternatively, the number of bits remaining output signal will be equal to the number of bits remaining input signal minus one when the number of bits remaining to be processed is non-zero.

The conversion block 200 further includes a right-shift-by-one operator 208 adapted to receive the mask input signal and to generate an output which is equal to the mask input signal shifted right by one bit position. The mask input signal and a right-shifted version of the mask input signal are fed to first and second inputs, respectively, of a second two-input multiplexer 210, and a control input of the multiplexer 210 is adapted to receive the output of the equal operator 202. The multiplexer 210 is configured to generate the mask output signal indicative of the first input or second input as a function of the control input. Thus, in one or more embodiments, the mask output signal will be equal to the mask input signal when the number of bits remaining to be processed by the conversion block 200 is zero. Alternatively, the mask output signal will be equal to the mask input signal shifted right by one bit position when the number of bits remaining to be processed by the conversion block 200 is non-zero.

The mask input signal is also supplied to a first input of a two-input AND gate 212. A left-shift-by-one operator 214 included in the conversion block 200 is adapted to receive the geohash code input signal and to generate an output which is equal to the geohash code input signal shifted left by one bit position. The geohash code input signal is also fed to a first input of a two-input OR gate 216. A second input of the OR gate 216 is adapted to receive an output of the AND gate 212. The left-shifted version of the geohash code input signal and the output of the OR gate 216 are fed to first and second inputs, respectively, of a third two-input multiplexer 218, and a control input of the multiplexer 218 is adapted to receive the mode input signal. The multiplexer 218 is configured to generate an output indicative of the first input or second input as a function of the control input. Thus, in one or more embodiments, the output generated by the multiplexer 218 will be equal to the left-shifted version of the geohash code input signal when the mode input signal is set for converting from a geohash code bit to a latitude (or longitude) value (i.e., mode=0), and will be equal to the output of the OR gate 216 when the mode input signal is set for converting from a latitude (or longitude) value to a geohash code bit (i.e., mode=1).

The geohash code input signal and the output of multiplexer 218 are fed to first and second inputs, respectively, of a fourth two-input multiplexer 220 included in the conversion block 200. A control input of the multiplexer 220 is adapted to receive the output of the equal operator 202. The multiplexer 220 is configured to generate the geohash code output signal indicative of the first input or second input as a function of the control input. Thus, in one or more embodiments, the geohash code output signal will be equal to the geohash code input signal when the number of bits remaining to be processed by the conversion block 200 is zero. Alternatively, the geohash code output signal will be equal to the output of multiplexer 218 when the number of bits remaining to be processed by the conversion block 200 is non-zero.

The conversion block 200 further includes a third relational operator, which in this embodiment is a comparator 222, configured to receive two input signals and to generate an output indicative of which of the two input signals is greater. Specifically, the comparator 222 is adapted to receive the latitude (or longitude) value input signal and the mid input signal and to generate a bit output signal indicative of whether the latitude (or longitude) value input signal is greater than the mid input signal. This bit output signal will then be replicated and supplied to a second input of the AND gate 212 and is used in generating the geohash code output. A most significant bit (MSB) of the geohash code input signal and the replicated bit output signal are supplied to first and second inputs, respectively, of a fifth multiplexer 224. A control input of the multiplexer 224 is adapted to receive the mode input signal. The multiplexer 224 is configured to generate an output signal indicative of the first input or second input as a function of the control input. Thus, in one or more embodiments, the output signal generated by the multiplexer 224 will be equal to the MSB of the geohash code input signal when the mode input signal is set for converting from a geohash code bit to a latitude (or longitude) value (i.e., mode=0), and will be equal to the replicated bit generated by the comparator 222 when the mode input signal is set for converting from a latitude (or longitude) value to a geohash code bit (i.e., mode=1).

The output signal generated by multiplexer 224 is supplied to a control input of a sixth two-input multiplexer 226 in the conversion block 200. The multiplexer 226 is adapted to receive the min input signal at a first input and the mid input signal at a second input. The multiplexer 226 is configured to generate an output signal indicative of the first input or second input as a function of the control input. Thus, in one or more embodiments, the output signal generated by the multiplexer 226 will be equal to the min input signal when the output of multiplexer 224 is a logic "0," and will be equal to the mid input signal when the output of multiplexer 224 is a logic "1."

The output of the multiplexer 226 and the min input signal are supplied to first and second inputs, respectively, of a seventh two-input multiplexer 228. A control input of the multiplexer 228 is adapted to receive the output of the equal operator 202. The multiplexer 228 is configured to generate the min output signal indicative of the first input or second input as a function of the control input. Thus, in one or more embodiments, the min output signal will be equal to the min input signal when the number of bits remaining to be processed by the conversion block 200 is zero. Alternatively, the min output signal will be equal to the output of multiplexer 226 when the number of bits remaining to be processed by the conversion block 200 is non-zero.

The min input signal and the max input signal are supplied to first and second inputs, respectively, of an eighth two-input multiplexer 230. A control input of the multiplexer 230 is adapted to receive the output signal generated by multiplexer 224. The multiplexer 230 is configured to generate an output signal indicative of the first input or second input as a function of the control input. Thus, in one or more embodiments, the output signal generated by the multiplexer 230 will be equal to the min input signal when the output of multiplexer 224 is a logic "0," and will be equal to the max input signal when the output of multiplexer 224 is a logic "1."

The mid input signal and the output of multiplexer 230 are supplied to a fourth relational operator, which in this embodiment is an adder 232, configured to generate an output indicative of a sum of the mid input signal and either the min or max input signals, depending on the logical state of the output signal generated by multiplexer 224. This summation signal is fed to a fifth relational operator, which in this embodiment is a divider 234, configured to generate a division signal which is equal to the summation signal divided by two; that is, the division signal generated by divider 234 will be equal to $$\frac{mid + \min}{2} \text{ or } \frac{mid + \max}{2},$$

depending on the state of the output signal generated by the multiplexer 224. This division signal generated by the divider 234 and the mid input signal are supplied to first and second inputs, respectively, of a ninth two-input multiplexer 236. A control input of the multiplexer 236 is adapted to receive the output of the equal operator 202. The multiplexer 236 is configured to generate the mid output signal indicative of the first input or second input as a function of the control input. Thus, in one or more embodiments, the mid output signal will be equal to the mid input signal when the number of bits remaining to be processed by the conversion block 200 is zero. Alternatively, the mid output signal will be equal to the output of multiplexer 236 when the number of bits remaining to be processed by the conversion block 200 is non-zero.

The mid input signal and the max input signal are supplied to first and second inputs, respectively, of a tenth two-input multiplexer 238. A control input of the multiplexer 238 is adapted to receive the output signal generated by multiplexer 224. The multiplexer 238 is configured to generate an output signal indicative of the first or second inputs as a function of the control input. Thus, in one or more embodiments, the output signal generated by multiplexer 238 will be equal to the mid input signal when the output of multiplexer 224 is a logic "0," and will be equal to the max input signal when the output of multiplexer 224 is a logic "1."

The output signal of multiplexer 238 and the max input signal are fed to first and second inputs, respectively, of an eleventh two-input multiplexer 240 in the conversion block 200. A control input of the multiplexer 240 is adapted to receive the output of the equal operator 202. The multiplexer 240 is configured to generate the max output signal indicative of the first or second inputs as a function of the control input. More particularly, in one or more embodiments, the max output signal will be equal to the max input signal when the number of bits remaining to be processed by the conversion block 200 is zero. Alternatively, the max output signal will be equal to the output of multiplexer 238 when the number of bits remaining to be processed by the conversion block 200 is non-zero.

In a conversion methodology according to aspects of the invention, given a geohash and an initial interval, the interval is updated based on the geohash bit. The middle of the output interval (i.e., mid output signal) corresponds to the latitude (or longitude) value. Likewise, given a latitude (or longitude) value and an initial interval, the interval is updated based on the location of the latitude/longitude value in the interval using floating point addition and division and a geohash bit is generated. The mode bit (i.e., mode input signal) determines conversion direction (i.e., geo-to-ll conversion for mode=0, or ll-to-geo conversion for mode=1).

It is to be appreciated that each of at least a subset of the input and output signals used by the conversion block 200 may be held, for at least a portion of the conversion process, in a corresponding register or alternative storage element, in accordance with one or embodiments. Furthermore, in one or embodiments, the divider 234 for performing the divide-by-two function may not necessarily be implemented in hardware, as the division by the constant 2 can be achieved with a simple subtract by 1 to the exponent or a mantissa shift in the case of floating point, as will become apparent to those skilled in the art.

The illustrative conversion block 200 depicted in FIG. 2 may be used for carrying out a single step—producing one geohash bit when converting from a latitude (or longitude) value, or updating the latitude (or longitude) value (i.e., interval mid) by processing one geohash bit when converting geohash code to latitude (or longitude), as previously stated. Converting an N-bit geohash code from or to latitude/longitude, where N is an integer, requires N passes through the single step previously described in conjunction with FIG. 2. For providing enhanced performance (e.g., speed), parallelism can be achieved at the level of converting a single geohash code bit by simultaneously processing the latitude and longitude portions. This entails deploying two single-step function blocks; one for latitude values and one for longitude values.

Figure 3:
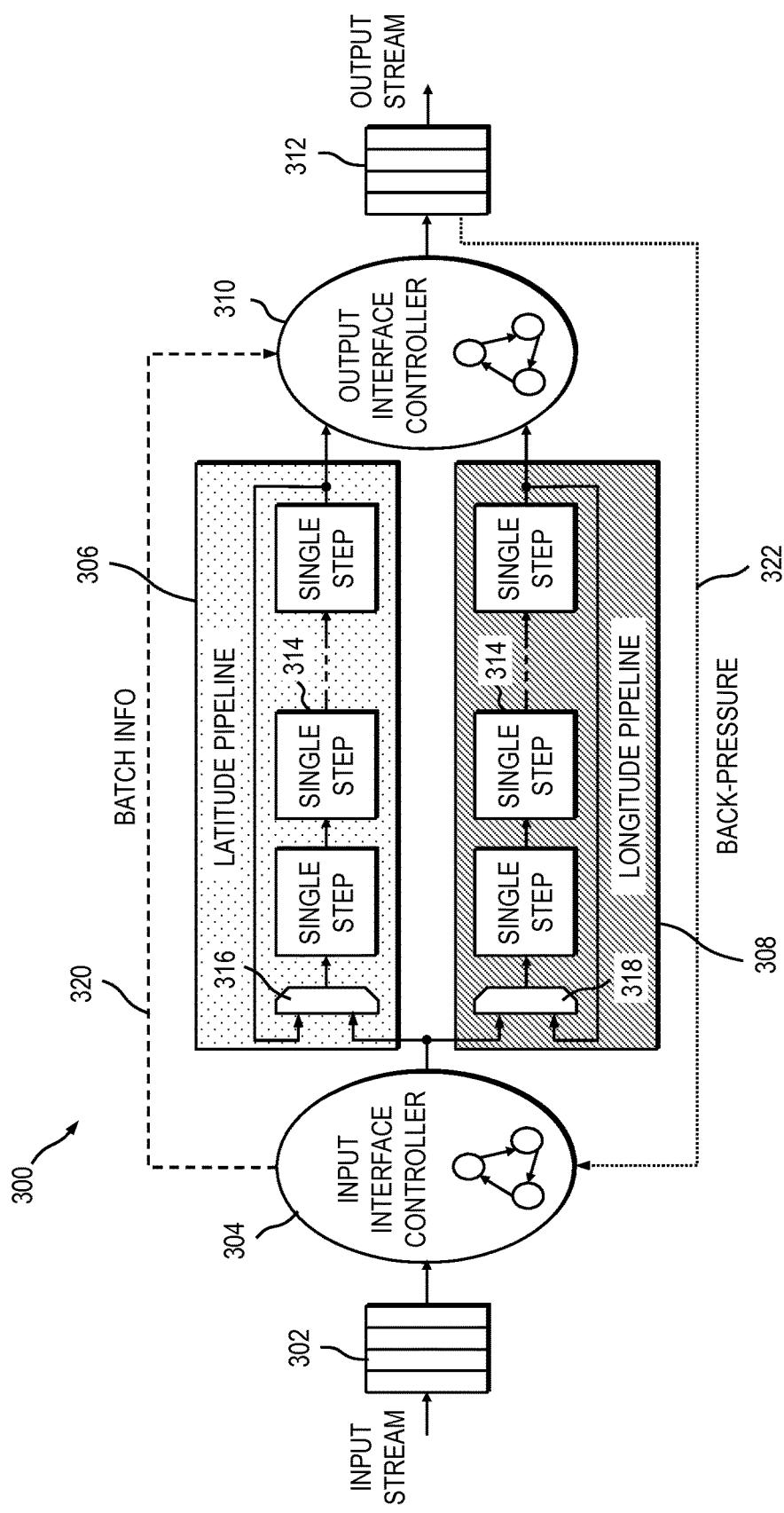
FIG. 3 is a block diagram depicting at least a portion of an exemplary conversion engine configured to parallelize the processing of latitude and longitude portions of a geohash code, while also parallelizing conversion across independent geohash codes, according to an embodiment of the invention.

FIG. 3 is a block diagram depicting at least a portion of an exemplary conversion engine 300 configured to parallelize the processing of latitude and longitude portions of a geohash code, while also parallelizing conversion across independent geohash codes, according to an embodiment of the invention. The conversion engine 300 includes a first register 302 for holding the input data stream which, depending on the conversion mode, will comprise an input geohash code or input latitude/longitude values, an input interface controller 304, a latitude pipeline 306, a longitude pipeline 308, an output interface controller 310, and a second register 312 for holding the output data stream which, depending on the conversion mode, will comprise output latitude/longitude values or an output geohash code. Each of the first and second registers 302 and 312, respectively, can be implemented, in one or more embodiments, using a first-in-first-out (FIFO) register, although aspects of the invention are not limited to this arrangement.

In the conversion engine 300, parallelism is achieved at the level of converting a single geohash code by simultaneously processing the latitude and longitude portions; this entails deploying two single-step function blocks or modules 314. Each of the single-step function blocks 314 may be implemented, in one or more embodiments, in a manner consistent with the basic conversion block 200 shown in FIG. 2 and previously described herein. Further parallelism can be attained when converting several geohash codes in parallel through the additional replication of the single-step function block 314, as depicted in the latitude pipeline 306 and longitude pipeline 308 used in the conversion engine 300.

More particularly, the geohash conversion engine 300 processes latitude/longitude portions of a geohash code in parallel using dedicated latitude and longitude pipelines 306 and 308, respectively, while providing parallelism across independent geohash codes. In one or more embodiments, the latitude and longitude pipelines 306 and 308, respectively, are configured to process several geohash codes (in either mode). Powered by the flexibility of the single-step conversion blocks 314, the input and output data streams can comprise both latitude/longitude values and geohash codes. In one or more embodiments, metadata is used to indicate the conversion mode of the conversion engine 300, as well as the number of bits to process (i.e., geohash precision). If a geohash code requires processing more bits than there are available single-step function blocks 314, then the geohash code is passed through the single-step function blocks multiple times as needed until the required number of bits have been processed.

More particularly, each of the latitude and longitude pipelines 306, 308 comprises a set of single-step blocks 314, as previously stated. Each geohash code passes through all the single-step blocks 314 in both pipelines 306, 308 in parallel. If the required precision of a given geohash code is less than or equal to the combined number of single-steps blocks 314 in both latitude and longitude pipelines, then one or more single-step blocks will simply pass the geohash code unmodified. On the other hand, if the required precision of a given geohash code is greater than the combined number of single-step blocks 314 in both latitude and longitude pipelines 306, 308, then the geohash code goes through the pipelines as many times as needed for all geohash bits to be processed.

In the case of geo-to-ll conversion, bits of the input geohash code are de-interleaved by the input interface controller 304 and passed simultaneously to multiplexers 316 and 318 in the latitude and longitude pipelines 306 and 308, respectively. The multiplexers 316, 318 are used to control whether the single-step function blocks 314 are processing a new input geohash code or updating the latitude/longitude values of a geohash code that has already passed through the pipelines 306, 308 one or more times. Similarly, in the case of ll-to-geo conversion, the geohash codes at the respective outputs of the latitude pipeline 306 and longitude pipeline 308 are interleaved by the output interface controller 310 before being pushed to the output data stream.

In order to increase efficiency in transferring data to/from the geohash conversion engine 300, the input and output interface controllers 304 and 310, respectively, in one or embodiments, support batch transfers, where a batch header specifies characteristics (e.g., metadata) of the data following it; this batch information 320 is shown in FIG. 3 as passing from the input interface controllers 304 to the output interface controller 310. The batch information 320 in the batch header comprises, for example, batch size (i.e., the number of conversions to be performed), conversion mode (e.g., geo-to-ll or ll-to-geo), number of bits to process per conversion (i.e., geohash precision), and the size of the geohash on the wire (i.e., during transfer to/from the converter).

In one or more embodiments, the geohash conversion engine 300 is configured having the following design-time architectural attributes:

Max geohash size: this field affects a size of the geohash code passed across the single-step function blocks 314, as well as a size of the mask and number of bits remaining signals. The max geohash size is an architected maximum geohash code that can be processed (in either mode). Hence, an N-bit geohash converter pipeline can support geohashes of size N or any smaller size, where N is an integer.

Number of deployed stages: this field specifies the total number of single-step function blocks 314 utilized in the respective latitude and longitude pipelines 306, 308. If the number of stages is smaller than the max geohash size, then a loopback connection 322 between the output register 312 and the input interface controller 304 is included in the conversion block 300. The number of stages determines the number of passes through a given pipeline to complete a given conversion, thus affecting performance. When limited by hardware resources, a converter designer may decide to deploy fewer stages rather than matching the max geohash size, assuming the resulting performance degradation is tolerable.

Supported transfer-side geohash sizes: given an architected max geohash size of N, any geohash of smaller size can also be processed through the conversion engine 300. However, when transferring geohashes of size M, where M is an integer less than N and is specified in the metadata using the number of bits remaining field, there are at least two available options, according to one or more embodiments: (i) transfer each geohash using N bits, which essentially wastes N-M bits for each conversion performed and is thus bandwidth wasteful, especially for smaller geohashes; or (ii) transfer geohashes contiguously using M bits each. While option (ii) is more bandwidth efficient, it requires the input/output (I/O) interface controllers 304, 310 to implement order of N shifters, which is generally not practical. Consequently, a middle-ground between the aforementioned two options is supporting a subset of N, such as all powers of two up to N. Here, geohashes of size M would be transferred on the wire using geohashes of the next closest power of two, which may still waste some bandwidth, though to a lesser extent compared to option (i). For example, a geohash of size 56 bits can be transferred using 64 bits, essentially wasting 8 bits, while a geohash of size 30 bits can be transferred using 32 bits, essentially wasting 2 bits. Furthermore, only $\log_2(N)$ shifters are deployed. In a converter pipeline implemented in accordance with one or more embodiments, geohashes transferred are of size any power of two less than or equal to the max geohash size.

Once the above three attributes have been set, the geohash conversion pipeline can be developed. In one or more embodiments, a utility (e.g., C++) is used to generate hardware description language (HDL) of the conversion pipeline, using prescribed parameter inputs. These inputs may include, for example, the max geohash size, the number of deployed stages, the supported transfer-side geohash size, bit-width of the I/O interfaces, as well as other lower-level options, such as extra buffering to meet timing considerations.

In one or more embodiments, a method is provided for performing lookup table-based geohash code to latitude/longitude conversion; specifically, using a lookup into a table of conversions that are pre-computed offline. This approach is in contrast to the online compute conversion methodology previously described herein. Like the compute conversion approach, lookup conversion supports variable-length geohash codes. Conversion using a lookup methodology advantageously removes the need for floating point operations. Note, that converting from latitude/longitude values to a geohash code using lookup is not feasible, except for the caching of common values. The lookup conversion approach is beneficial, particularly when faced with limited hardware resources for computation and compromising on performance is not an option.

By way of example only and without limitation, Table 1 below encapsulates a subset of an exemplary pre-computed lookup table with respect to a longitude conversion.

TABLE 1

| Address | Longitude Geohash | min | mid | max |
|---|---|---|---|---|
| 0 | 0 | −180 | −90 | 0 |
| 1 | 1 | 0 | 90 | 180 |
| 2 | 00 | −180 | −135 | −90 |
| 3 | 01 | 0 | 45 | 90 |
| 4 | 10 | −90 | −45 | 0 |
| 5 | 11 | 90 | 135 | 180 |
| 6 | 000 | −180 | −157.5 | −135 |
| 7 | 001 | 0 | 22.5 | 45 |
| ... | ... | ... | ... | ... |

Addresses 0 through 1 in Table 1 above represent conversions for longitude of length 1 bit, addresses 2 through 5 represent conversions for longitude of length 2 bits, addresses 6 through 7 represent a subset of conversions for longitude of length 3 bits, and so on. A look-up table can be generated for latitude conversion in a similar manner, only using different values, since the latitude and longitude have different starting intervals, as will become apparent to those skilled in the art given the teachings here.

In a more general scheme, given a longitude geohash code of length L, where L is an integer, the address for the conversion is computed as follows, in one or more embodiments:

longitude_geohash_code+offset, where the offset is 0 when the longitude geohash code of length L is 1; otherwise, the offset is computed as follows, in one or more embodiments:

offset=$\Sigma_{i-1}^{L-1} 2^i$.

The offset need not be computed at runtime; rather, it can be hard-wired in the address computation logic for different values of L (L is preferably kept small to limit the required memory size).

Figure 4:
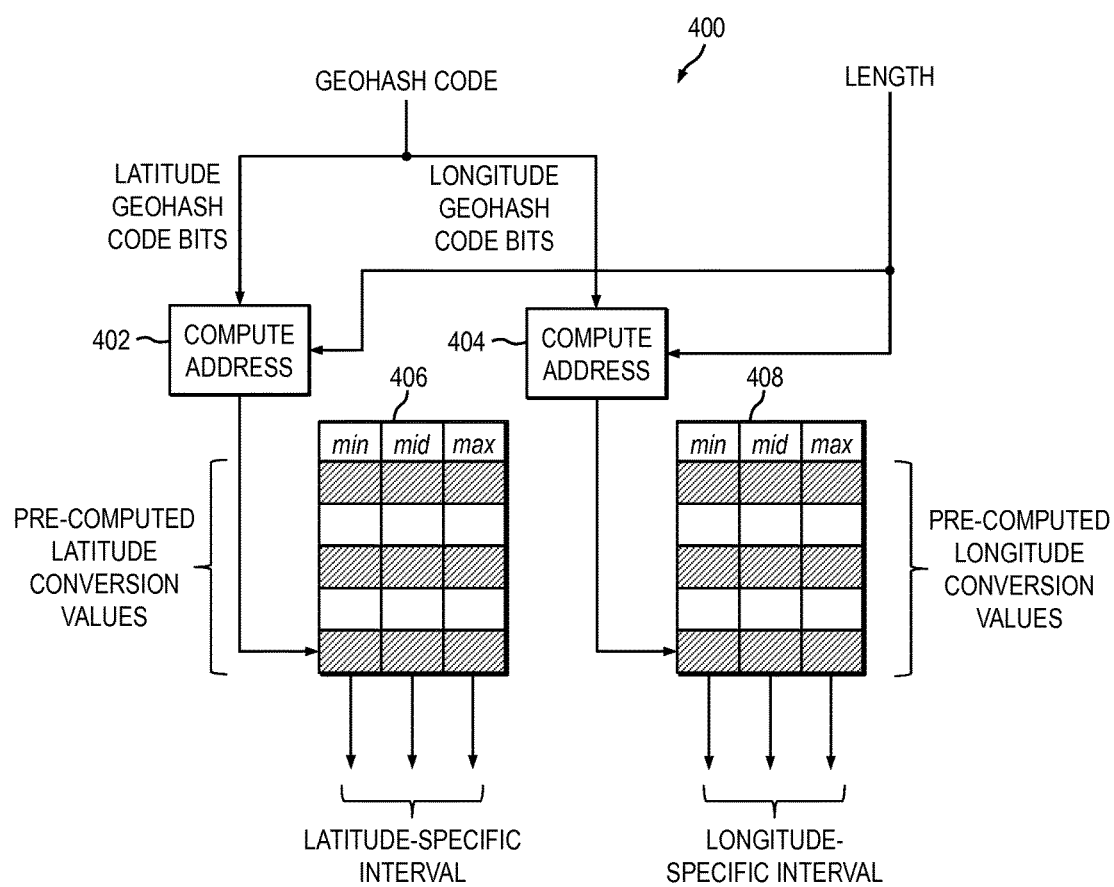
FIG. 4 is a block diagram depicting at least a portion of an exemplary lookup-based conversion methodology, according to an embodiment of the invention.

FIG. 4 is a block diagram depicting at least a portion of an exemplary lookup-based conversion engine 400 for converting a geohash code to latitude/longitude coordinates, according to an embodiment of the invention. The conversion engine 400 includes a first address computation module 402 configured for computing a latitude address as a function of a latitude geohash code portion of the geohash code and a prescribed latitude/longitude geohash code length supplied to the conversion engine. The conversion engine 400 further includes a second address computation module 404 configured for computing a longitude address as a function of a longitude geohash code portion of the geohash code and the prescribed latitude/longitude geohash code length. The latitude and longitude addresses are supplied to corresponding latitude and longitude lookup tables, 406 and 408, respectively. The latitude lookup table 406 is configured for storing pre-computed latitude conversion values which are accessed as a function of the latitude address supplied thereto; that is, the latitude address serves as an index into the latitude lookup table 406. Similarly, the longitude lookup table 408 is configured for storing pre-computed longitude conversion values which are accessed as a function of the longitude address supplied thereto; that is, the longitude address serves as an index into the longitude lookup table 408. It is to be understood that conversion using this illustrative look-up table approach is unidirectional (i.e., geohash-to-ll only), whereas conversion using the exemplary compute configuration shown in FIGS. 2 and 3 is bidirectional (i.e., bimodal).

In this embodiment, the latitude and longitude lookup tables 406 and 408, respectively, are organized having a plurality of rows, each row corresponding to a unique address, and three columns; namely, min, mid and max corresponding to min, mid and max interval values, respectively. Output min, mid and max values generated by the latitude lookup table 406 form a latitude-specific interval, and output min, mid and max values generated by the longitude lookup table 408 form a longitude-specific interval.

The lookup conversion methodology described above in conjunction with Table 1 can, in one or more embodiments, be combined with the compute methodology in order to reduce the number of hardware stages required. For instance, FIG. 5 conceptually depicts at least a portion of an exemplary methodology 500 for combining the lookup conversion method with the compute conversion method, according to an embodiment of the invention. For generality, geohash codes of length 2N bits are drawn, alongside two pre-computed geo-to-ll lookup tables that convert at most X bits each. Specifically, a first lookup table is included in a latitude lookup-based conversion block 502, and a second lookup table is included in a longitude lookup-based conversion block 504. The following discussion applies to either of the latitude or longitude portions of the geohash code.

Figure 5:
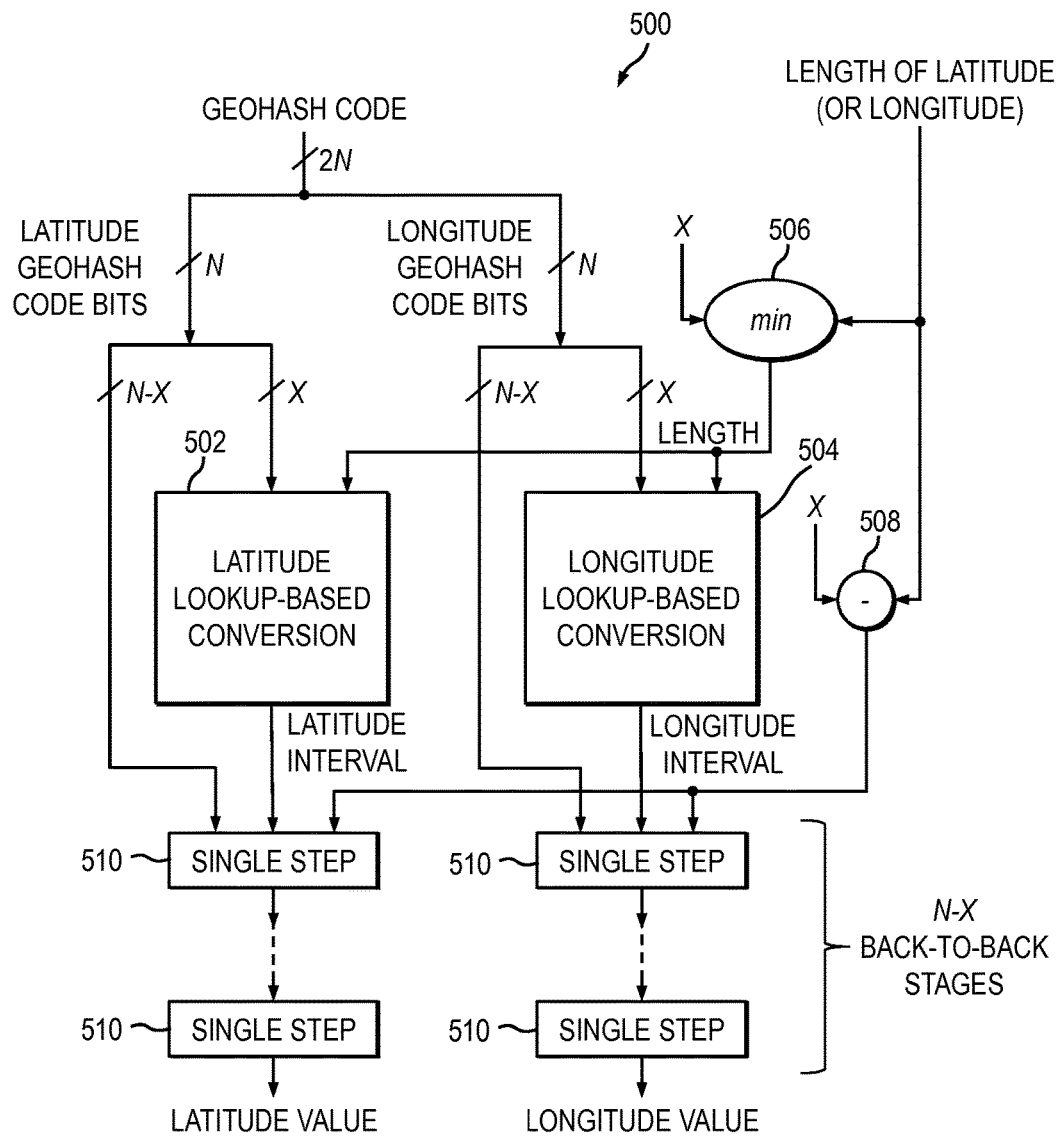
FIG. 5 conceptually depicts at least a portion of an exemplary methodology for combining a lookup conversion methodology with a compute conversion methodology, according to an embodiment of the invention.

With reference to FIG. 5, if the latitude (or longitude) geohash code length N is less than the number of bits being converted X, as determined by a minimum (or min) function module 506, then conversion can be achieved fully by lookup using the lookup-based conversion blocks 502, 504 (i.e., there is no need to perform compute method). Otherwise, X bits are first converted by lookup, providing an output interval for subsequent processing, and the remaining N-X bits, as determined by a subtraction module 508, are converted by the compute method utilizing one or more single-step function modules 510 connected in a serial pipeline configuration. The output of the lookup table is supplied to the single-step function modules 510 and is used as the starting interval for the compute method. Note that loopback (i.e., back-pressure) can be applied from the last to the first compute stages (omitted in FIG. 5 for simplicity, but shown as path 322 in FIG. 3). Advantageously, by combining lookup conversion and compute conversion approaches, only N-X single-step function modules 510 are required, compared with N single-step stages required using only the compute method alone. As previously stated, the lookup-based conversion approach is applicable to the geo-to-ll mode while the compute-based conversion approach can be used for both modes (geo-to-ll and ll-to-geo).

Given the discussion thus far, it will be appreciated that, in general terms, an exemplary apparatus for converting between a geohash code and latitude/longitude coordinates, according to an aspect of the invention, includes a conversion module operative in one of at least first and second modes. In the first mode, the conversion module is adapted to receive a geohash code, a number of geohash code bits remaining to be processed and an initial input interval, and being configured to generate first and second output intervals that are updated after each geohash code bit processed. The latitude and longitude coordinates are generated based on the first and second output intervals, respectively. In the second mode of operation, the first conversion module is adapted to receive a latitude or longitude value, the number of geohash code bits remaining to be processed and the initial input interval, and is configured to generate a given one of the first and second output intervals. The first or second output interval is set as the input interval of a next subsequent hardware cycle. The first conversion module is configured to process data at a rate of one geohash code bit per hardware cycle.

The present invention provides, in one or more embodiments, a conversion engine for converting between a geohash code and latitude and longitude coordinates. The conversion engine includes a first register for holding an input data stream which comprises an input geohash code or input latitude and longitude values, depending on the conversion mode in which the conversion engine is operating. A first interface controller is coupled with the first register, the first interface controller being configured, in a first conversion mode, to de-interleave the input data stream. The conversion engine further includes first and second conversion pipelines coupled with the first interface controller. The first conversion pipeline is configured to convert between a geohash code and latitude coordinates, and the second conversion pipeline is configured to convert between the geohash code and longitude coordinates. A second interface controller is coupled with the first and second conversion pipelines, the second interface controller being configured, in a second conversion mode, to interleave respective outputs of the first and second conversion pipelines before being pushed to an output data stream. The conversion engine includes a second register coupled with the second interface controller and configured for holding the output data stream which comprises output latitude and longitude values or an output geohash code, depending on the conversion mode in which the conversion engine is operating. The conversion engine is configured to process data at a rate of one geohash code bit per hardware cycle.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
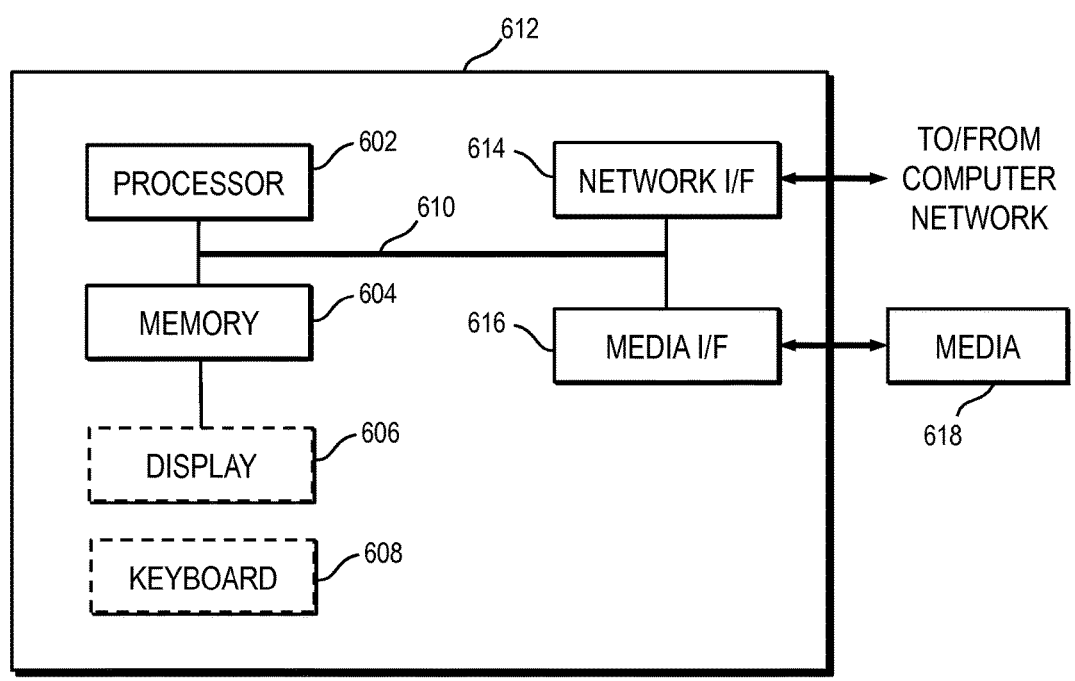
FIG. 6 depicts a computer system that may be useful in implementing one or more aspects and/or elements of the invention.

One or more embodiments can make use of software running on a general purpose computer or workstation which, when configured according to one or more embodiments of the invention, becomes a special-purpose apparatus. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any non-transitory medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that at least a portion of one or more modules of the flowchart illustrations and/or block diagrams, and combinations of modules in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved and/or the specific application in which the method is employed. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a non-transitory computer readable storage medium; the modules can include, for example, any or all of the elements depicted in the block diagrams and/or described herein; by way of example only and without limitation, an equal operator, a subtraction operator, a shift-right-by-one operator, a shift-left-by-one operator, an adder, a divide-by-two operator and a multiplexer. The method steps can then be carried out using the distinct software modules and/or sub-modules of the system, as described above, executing on one or more hardware processors 602. Further, a computer program product can include a non-transitory computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuits (ASICs), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for converting between a geohash code and latitude/longitude coordinates, the apparatus comprising:
   at least one hardware processor; and
   at least a first conversion module executing on the at least one hardware processor, the first conversion module being operative in one of at least first and second modes,
      in the first mode, the conversion module being adapted to receive a geohash code, a value indicative of a number of geohash code bits remaining to be processed and initial first and second input intervals, and being configured to generate first and second output intervals that are updated after each geohash code bit processed, latitude and longitude coordinates being generated as a function of the first and second output intervals, respectively,
      in the second mode, the first conversion module being adapted to receive one of a latitude value and a longitude value, indicative of the number of geohash code bits remaining to be processed, and the initial first and second input intervals, and being configured to generate a given one of the first and second output intervals that is updated based on a comparison between a middle value of the first and second input intervals and one of the latitude value and the longitude value, respectively, being converted, the given one of the first and second output intervals being set as the first or second input interval, respectively, of a next subsequent hardware cycle, a geohash code bit corresponding to one of the latitude and longitude values being converted being generated as a function of a middle value of the given one of the first and second output intervals, respectively;
   wherein the first conversion module is configured to process data at a rate of one geohash code bit per hardware cycle.

2. The apparatus of claim 1, wherein the first conversion module is configured to support variable precision geohash codes by modifying a number of hardware cycles as a function of a number of geohash code bits to process.

3. The apparatus of claim 1, wherein the first conversion module comprises:
   a first relational operator configured to receive a first control signal indicative of a number of bits remaining to be processed by the apparatus and to generate a first output signal indicative of whether the number of bits remaining to be processed is equal to zero;
   a second relational operator configured to generate a second output signal having a value equal to the number of bits remaining to be processed decremented by a prescribed number; and
   a first multiplexer configured to generate a third output signal indicative of either the number of bits remaining to be processed or the second output signal as a function of the first output signal.

4. The apparatus of claim 3, wherein the first conversion module comprises:
   a right-shift-by-one operator configured to receive a mask input signal and to generate a fourth output signal indicative of the mask input signal shifted right by one bit position; and
   a second multiplexer configured to generate a fifth output signal indicative of either the mask input signal or the mask input signal shifted right by one bit position as a function of the first output signal.

5. The apparatus of claim 1, wherein the first conversion module comprises:
   a first relational operator configured to receive a first control signal indicative of a number of bits remaining to be processed by the apparatus and to generate a first output signal indicative of whether the number of bits remaining to be processed is equal to zero;
   a logical AND gate configured to receive a mask input signal and a bit output signal, the bit output signal being indicative of whether one of a latitude and a longitude value input signal is greater than a middle value of an input interval, and to generate a second output signal indicative of a logical AND of the mask input signal and bit output signal;
   a logical OR gate configured to receive the geohash code input signal and the second output signal and to generate a third output signal indicative of a logical OR of the geohash code input signal and the second output signal;
   a left-shift-by-one operator configured to receive the geohash code input signal and to generate a fourth output signal indicative of the geohash code input signal shifted left by one bit position;
   a first multiplexer configured to generate a fifth output signal indicative of either the third output signal or the fourth output signal as a function of a mode signal; and
   a second multiplexer configured to generate a sixth output signal indicative of either the geohash code input signal or the fifth output signal as a function of the first output signal.

6. The apparatus of claim 1, wherein the first conversion module comprises:
   a first relational operator configured to receive a first control signal indicative of a number of bits remaining to be processed by the apparatus and to generate a first output signal indicative of whether the number of bits remaining to be processed is equal to zero;
   a comparator configured to receive the geohash code input signal and a middle value of an input interval, and to generate a second output signal indicative of a comparison between the geohash code input signal and the middle value of the input interval;
   a first multiplexer configured to generate a third output signal indicative of either the second output signal or a most significant bit of the geohash code input signal as a function of a mode signal;
   a second multiplexer configured to generate a fourth output signal indicative of either a minimum value of the input interval or the middle value of the input interval as a function of the third output signal;
   a third multiplexer configured to generate a fifth output signal indicative of either the minimum value of the input interval or a maximum value of the input interval as a function of the third output signal;

a fourth multiplexer configured to generate a sixth output signal indicative of either the middle value of the input interval or the maximum value of the input interval as a function of the third output signal;

an adder configured to generate a sum signal equal to a summation of the middle value of the input interval and the fifth output signal;

a divider configured to generate a divide signal equal to a division of the sum signal by two;

a fifth multiplexer configured to generate a minimum value of a given one of the first and second output intervals indicative of either the fourth output signal or the minimum value of the input interval as a function of the first output signal;

a sixth multiplexer configured to generate the middle value of the given one of the first and second output intervals indicative of either the divide signal or the middle value of the input interval as a function of the first output signal; and a seventh multiplexer configured to generate a maximum value of the given one of the first and second output intervals indicative of either the sixth output signal or the maximum value of the input interval as a function of the first output signal.

7. The apparatus of claim 1, wherein the first conversion module comprises:

a first address computation module configured for computing one of a latitude address and a longitude address as a function of one of a latitude geohash code portion and a longitude geohash code portion, respectively, of the geohash code and a prescribed geohash code length supplied to the first conversion module; and a first lookup table coupled with the first address computation module, the first lookup table being configured for storing one of pre-computed latitude and longitude conversion values which are accessed as a function of one of the latitude address and longitude address, respectively, supplied to the first lookup table, the one of the latitude address and longitude address serving as an index into the first lookup table.

8. The apparatus of claim 7, wherein the first lookup table is configured having a plurality of rows, each row corresponding to a unique address, and first, second and third columns corresponding to minimum, middle and maximum output interval values, respectively.

9. The apparatus of claim 7, further comprising a second address computation module and a second lookup table, the first address computation module being configured for computing the latitude address as a function of the latitude geohash code portion of the geohash code and a prescribed latitude geohash code length, the second address computation module being configured for computing the longitude address as a function of the longitude geohash code portion of the geohash code and a prescribed longitude geohash code length, the first lookup table being configured for storing the pre-computed latitude conversion values which are accessed as a function of the latitude address serving as an index into the first lookup table, and the second lookup table being configured for storing the pre-computed longitude conversion values which are accessed as a function of the longitude address serving as an index into the second lookup table.

10. The apparatus of claim 9, wherein each of the first and second lookup tables are configured having a plurality of rows, each row in the first lookup table corresponding to a unique latitude address, each row in the second lookup table corresponding to a unique longitude address, and wherein each of the first and second lookup tables are configured having first, second and third columns corresponding to minimum, middle and maximum output interval values, respectively.

11. The apparatus of claim 1, further comprising a second conversion module, wherein the first conversion module is configured for converting between a latitude portion of the geohash code and the latitude coordinate, and the second conversion module is configured for converting between a longitude portion of the geohash code and the longitude coordinate.

12. The apparatus of claim 11, wherein the first and second conversion modules are configured to perform respective conversion operations in parallel with one another.

13. A conversion engine for converting between a geohash code and latitude and longitude coordinates, the conversion engine comprising:

a first register for holding an input data stream which comprises one of an input geohash code and input latitude and longitude values, depending on a conversion mode in which the conversion engine is operating;

a first interface controller coupled with the first register, the first interface controller being configured, in a first conversion mode, to de-interleave the input data stream;

first and second conversion pipelines coupled with the first interface controller, the first conversion pipeline being configured to convert between a geohash code and latitude coordinates, the second conversion pipeline being configured to convert between the geohash code and longitude coordinates;

a second interface controller coupled with the first and second conversion pipelines, the second interface controller being configured, in a second conversion mode, to interleave respective outputs of the first and second conversion pipelines to generate a corresponding geohash code before pushing the corresponding geohash code to an output data stream; and a second register coupled with the second interface controller and configured for holding the output data stream which comprises one of output latitude and longitude values and an output geohash code, depending on the conversion mode in which the conversion engine is operating;

wherein the conversion engine is configured to process data at a rate of one geohash code bit per hardware cycle.

14. The conversion engine of claim 13, wherein the first and second interface controllers are configured to support batch transfers, whereby information in a batch header included in the input data stream is passed between the first and second interface controllers and used to facilitate conversion between the geohash code and the latitude and longitude coordinates.

15. The conversion engine of claim 14, wherein the information in the batch header comprises at least one of batch size, conversion mode, number of bits to process per conversion, and size of the geohash code during transfer to or from the conversion engine.

16. The conversion engine of claim 13, wherein each of a given one of the first and second conversion pipelines comprises a plurality of single-step conversion modules configured such that an output of one single-step conversion module is supplied as an input to a next subsequent single-step conversion module in the given one of the conversion pipelines.

17. The conversion engine of claim 16, further comprising a loopback connection between the second register and the first interface controller, the loopback connection being configured to facilitate conversion when a number of single-step conversion modules in the given one of the conversion pipelines is smaller than a maximum geohash code size.

18. The conversion engine of claim 16, wherein each of the first and second conversion pipelines comprises a multiplexer, the multiplexer in the given one of the first and second conversion pipelines being configured to control whether the single-step conversion modules are processing a new input geohash code received from the input data stream or are updating one of the latitude and longitude values of a geohash code that has already passed through the given one of the first and second conversion pipelines one or more times.

19. The conversion engine of claim 16, wherein each of the first and second conversion pipelines comprises a lookup-based conversion module adapted to receive a first subset of bits of the input geohash code and a control signal indicative of a minimum of a number of single-step conversion modules and a length of one of the latitude and longitude coordinates, the lookup-based conversion module being configured to generate an output interval that is used as an input starting interval by the plurality of single-step conversion modules in the given one of the first and second conversion pipelines, wherein the single-step conversion modules are configured to process a second subset of bits of the input geohash code in parallel with processing of the first subset of bits of the input geohash code by the lookup-based conversion module.

20. The conversion engine of claim 13, wherein the first conversion pipeline is configured to perform a conversion between a latitude component of the geohash code and the latitude coordinates, and the second conversion pipeline is configured to perform a conversion between a longitude component of the geohash code and the longitude coordinates.

* * * * *